(12) United States Patent
Déjean

(10) Patent No.: US 8,023,740 B2
(45) Date of Patent: Sep. 20, 2011

(54) SYSTEMS AND METHODS FOR NOTES DETECTION

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1072 days.

(21) Appl. No.: 11/891,731

(22) Filed: Aug. 13, 2007

(65) Prior Publication Data

US 2009/0046918 A1 Feb. 19, 2009

(51) Int. Cl.
*G06K 9/00* (2006.01)
*G06F 17/00* (2006.01)

(52) U.S. Cl. ........................................ 382/181; 715/205
(58) Field of Classification Search .................... None
See application file for complete search history.

(56) References Cited

U.S. PATENT DOCUMENTS

| | | | | |
|---|---|---|---|---|
| 4,503,515 | A | * | 3/1985 | Cuan et al. .................... 715/205 |
| 4,648,067 | A | | 3/1987 | Repass et al. |
| 5,870,767 | A | * | 2/1999 | Kraft, IV ...................... 715/205 |
| 6,971,062 | B1 | | 11/2005 | Tolpin |
| 2004/0006742 | A1 | | 1/2004 | Slocombe |
| 2006/0155700 | A1 | | 7/2006 | Dejean et al. |
| 2006/0155703 | A1 | | 7/2006 | Dejean et al. |
| 2006/0156225 | A1 | * | 7/2006 | Burago et al. ................ 715/517 |
| 2006/0156226 | A1 | | 7/2006 | Dejean et al. |
| 2006/0248070 | A1 | | 11/2006 | Dejean et al. |
| 2007/0133029 | A1 | * | 6/2007 | Deriaguine et al. ......... 358/1.13 |

OTHER PUBLICATIONS

Abbyy Software, "Abbyy FineReader Engine 8.0, Four-in One-SDK," Product Information, 4 pp., Abbyy Europe BmbH, 2006.
Rehm, "Language-Independent Text Parsing of Arbitrary HTML-Documents. Towards a Foundation for web Genre Identification," LDV-Forum—Band 20(2), pp. 53-74, 2005.
Wikipedia, "Regular expression," Wikimedia Foundation, Inc., at http://en.wikipedia.org/wiki/Regular_expression, last visited Jun. 25, 2007.

* cited by examiner

*Primary Examiner* — Tom Y Lu
(74) *Attorney, Agent, or Firm* — Fay Sharpe LLP

(57) ABSTRACT

To perform notes detection, candidate reference marks are identified in a document. A starting note zone is identified in the document. A pair of similar reference marks is identified from the candidate reference marks including a first reference mark in the note zone and a second reference mark outside the note zone. The document is marked up to indicate a note associated with the first and second reference marks.

21 Claims, 4 Drawing Sheets

SYSTEMS AND METHODS FOR NOTES DETECTION

BACKGROUND

The following relates to the document creation, processing, storage, display, and related arts.

There is interest in conversion to a selected structured format of hardcopy documents or documents in specialized or proprietary electronic formats such as certain word processing formats, certain spreadsheet formats, certain presentation formats, and so forth. The selected structured format is typically hypertext markup language (HTML), extensible markup language (XML), standard generalized markup language (SGML), or another structured format having defined markup formatting syntax or rules. Such conversion ensures the documents do not become unusable in the event that software capable of reading the specialized or proprietary format becomes unavailable. Conversion also facilitates indexing and creation of knowledge databases or other searchable document repositories.

Document conversion typically begins with obtaining the document in an unstructured or undesirably structured form. For electronic documents such as word processing documents, this entails identifying the document by filename and file path, by URL, or so forth, and in some cases performing some initial format conversion operations. For a hardcopy document, this entails optically scanning the document and performing optical character recognition (OCR) to generate an unstructured or shallowly structured electronic text-based copy. The obtained electronic document is segmented into lines and tokens or other word-size elements, and may be provided with some shallow structuring such as demarcation of paragraphs or pagination. There are commercially available products, such as FineReader (available from ABBYY USA Software House, Fremont, Calif.), that provide scanning and OCR of hardcopy documents and further provide tokenization and conversion of the document into a shallow or largely unstructured XML format. The unstructured or shallowly structured document provides the basis for further analysis and marking up of structural features of interest. For example markup tags or other structural document formatting can be used to mark features such as chapters, sections, tables, and so forth.

One feature of interest is reference notes, such as footnotes, endnotes, table notes, and so forth. Usually, a note includes two parts: (i) a reference mark such as a raised superscript number or symbol in the body of the text, table, or other structure that draws the reader's attention to the note; and (ii) a replication of the reference mark at the bottom of the page (for footnotes), or at the end of a section or document (for endnotes), or after a table (for table notes) followed by the note text. Identification of notes is useful both to enable the document to be marked up to indicate the note, and to ensure that the note is not misinterpreted during document analysis. If not recognized as a note, it is possible for the reference mark to be misinterpreted as part of a word, or for the note text to be misinterpreted as a section heading, paragraph, list item, or other structure. Such misinterpretation can in turn lead to misspelled words, improper text flow, or other incongruities in the marked up document.

An existing technique for identifying footnotes employs recognition of a bottom-of-page separating horizontal line that is sometimes used to separate the footnotes from the body of text on the page. This approach is robust if the document uses such a separating horizontal line and the line is retained during optical scanning and OCR, but is inoperative otherwise. Moreover, this approach does not work for endnotes. Other techniques utilize layout information such as font size to identify reference marks of the note. These techniques can be overinclusive if the document uses such layout features to denote other document elements, and can be underinclusive if the document uses a mechanism such as brackets to set off the reference marks. Moreover, these techniques are not useful if the OCR or other processing fails to retain the layout features relied upon to identify the reference marks.

BRIEF DESCRIPTION

In some illustrative embodiments disclosed as illustrative examples herein, a notes detection method is disclosed, comprising: identifying candidate reference marks in a document; identifying a starting note zone in the document; identifying a pair of similar reference marks from the candidate reference marks including a first reference mark in the note zone and a second reference mark outside the note zone; and marking up the document to indicate a note associated with the first and second reference marks.

In some illustrative embodiments disclosed as illustrative examples herein, a notes detection system is disclosed, comprising: a candidate reference marks identification subsystem configured to identify candidate reference marks in a document; and a linked reference marks identification subsystem configured to identify a pair of similar reference marks from the candidate reference marks including a first reference mark in the note zone and a second reference mark outside the note zone.

In some illustrative embodiments disclosed as illustrative examples herein, a storage medium or storage media is or are disclosed, storing software including: candidate reference marks identification software executable to identify candidate reference marks in a document; linked reference marks identification software executable to identify a pair of similar reference marks from the candidate reference marks including a first reference mark in the note zone and a second reference mark outside the note zone; and note markup software executable to mark up the document to indicate a note associated with the first and second reference marks.

In some illustrative embodiments disclosed as illustrative examples herein, a storage medium or storage media is or are disclosed, storing software executable to detect a note in a document by identifying candidate reference marks based on loose pattern comparison and identifying a pair of linked body and note reference marks from the candidate reference marks based on similarity of the identified pair of linked reference marks and location of at least one of the reference marks of the pair of linked reference marks in the document.

DETAILED DESCRIPTION

Figure 1:
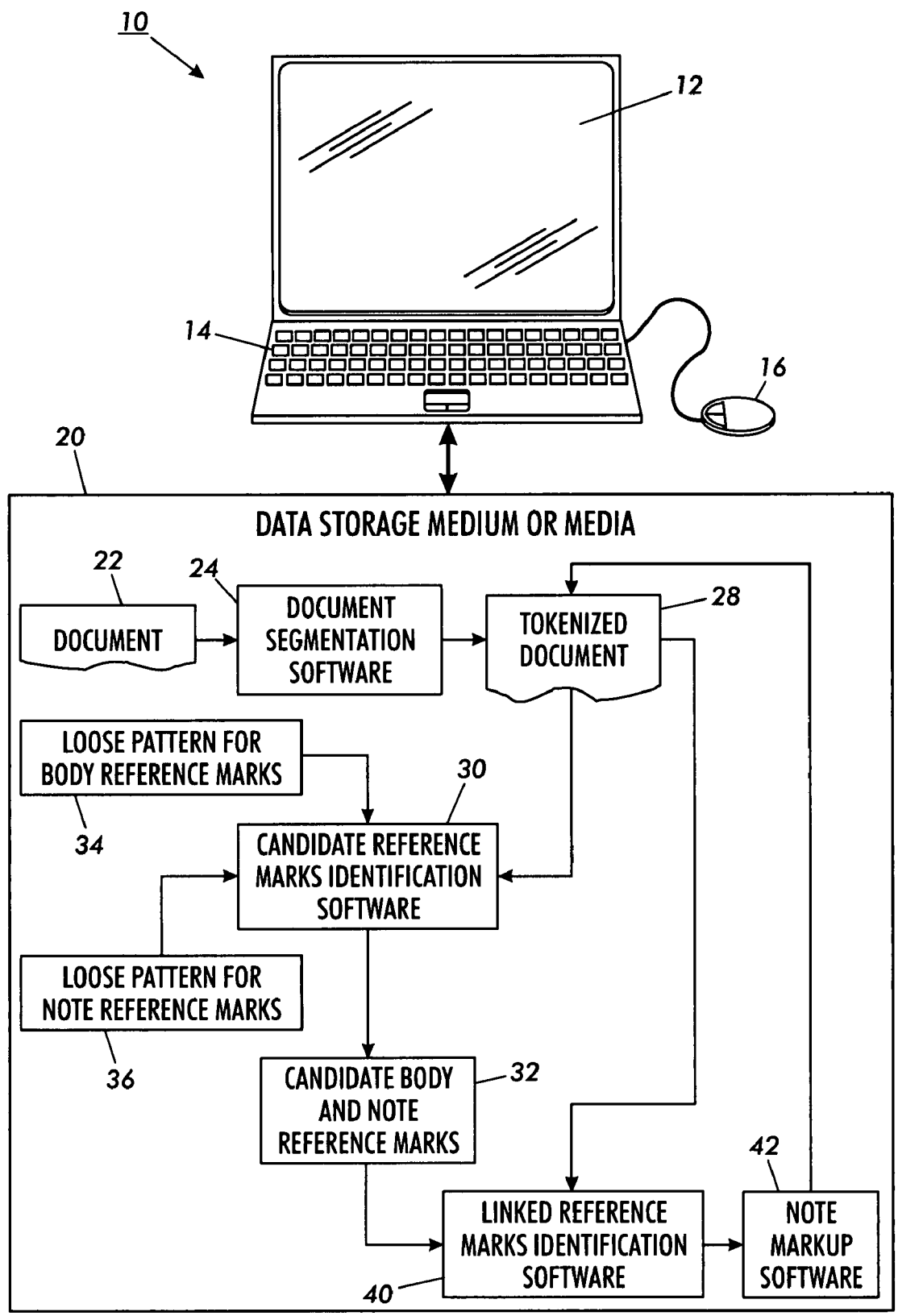
FIG. 1 diagrammatically shows a notes detection and markup system.

With reference to FIG. 1, a notes detection and markup system includes a computer 10 with at least one processor, a display 12, user input devices including a keyboard 14 and a mouse 16, and one or more storage media 20, the latter being diagrammatically depicted in FIG. 1. The at least one processor of the computer 10 is not shown in FIG. 1. Some suitable processors include single-core, dual-core, quad-core or otherwise configured microprocessors, microcontrollers, and so forth. The illustrated display 12 can be a liquid crystal display (LCD), a plasma display, a cathode ray tube (CRT) display, a projection display, or so forth. The user input devices 14, 16 are illustrative examples, and can be supplemented or replaced by other user input devices such as a membrane keypad, trackball, touchpad, voice-recognition input, or so forth.

The one or more storage media 20 can include random access memory (RAM), read-only memory (ROM), a hard disk, optical disk, or so forth. The one or more storage media 20 store data, including a document 22 and software for performing analysis and markup of the document. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The terms "system" and "subsystem" as used herein is intended to encompass systems and subsystems embodied purely as hardware, for example an analog, digital, or mixed application-specific integrated circuit (ASIC), systems and subsystems embodied as a combination of hardware such as a computer or other digital device and software executable on said hardware, such as the system illustrated in FIG. 1, or a combination of such systems or subsystems. Moreover, the phrase "storage medium storing software executable to" perform some function as used herein is intended to encompass any storage medium that stores software that is executable on a computer or other digital device to perform said function. Examples of suitable storage media include RAM, ROM, a hard disk, an optical disk, a web-based server, or so forth.

With continuing reference to FIG. 1, the data storage medium or media 20 further stores document segmentation software 24 executable on the computer 10 to tokenize the document 22 to generate a tokenized document 28. Thus, the computer 10 and the document segmentation software 24 that can execute on the computer 10 together define a document segmentation subsystem. The illustrative notes detection and markup system includes other subsystems for performing other tasks. A candidate reference marks identification subsystem is embodied in the illustrative example as the computer 10 together with candidate reference marks identification software 30, and analyzes the tokenized document 28 to generate a set of candidate reference marks 32. In some embodiments, the candidate reference marks identification subsystem identifies candidate body reference marks by comparison of tokens of the tokenized document 28 with a loose pattern for body reference marks 34, and further identifies candidate note reference marks by comparison of tokens of the tokenized document 28 with a loose pattern for note reference marks 36.

The illustrative notes detection and markup system of FIG. 1 further includes a linked reference marks identification subsystem embodied in the illustrative example as the computer 10 together with linked reference marks identification software 40. The linked reference marks identification subsystem identifies pairs of linked body and note reference marks from the candidate reference marks 32 based on similarity of the identified pair of linked reference marks and location of at least one of the reference marks of the pair of linked reference marks in the tokenized document 28. A note markup subsystem is embodied in the illustrative example as the computer 10 together with note markup software 42. The note markup subsystem marks up the tokenized document 28 or another version of the document 22 to indicate the detected note.

Table 1 identifies some types of notes that occur in documents. A

TABLE 1

Types of Notes

| Type of Note | Note zone | Body zone |
|---|---|---|
| Footnote | Bottom of page | Page body |
| Margin note | Margin of page | Page body |
| Table note | Region below table | Table body |
| End notes | End of document or logical element | Document or logical element such as section, chapter, or so forth |
| Image note | Region below image | Image body |
| Affiliation note | Region below affiliation | Affiliation | note generally includes: (i) note text placed in the note zone; (ii) a note reference mark preceding the note text in the note zone that labels or indexes the note text; and (iii) a corresponding body reference mark in the body zone such that the reference marks in the body and note zone provide a link between the referenced body text and the note text. In the case of footnotes, the note texts for the notes, each preceded by its corresponding note reference mark, are collected at the bottom of the page containing the corresponding body reference notes. In the case of end notes, the notes are collected at the end of a document, section, or other logical unit of the document. The note text typically provides comment, additional information, an identification of a relevant external reference, a cross-reference to another part of the same document, or other information relevant to the referenced body text. As used herein, "note text" is to be broadly construed as encompassing textual information as well as images, tables, or other informational content of the note. Various reference mark systems are used in documents, such as enumerating notes using superscript reference numerals (i.e., the reference marks being $^1$, $^2$, $^3$, . . . ), reference marks being bracketed numerals (i.e., the reference marks being [1], [2], [3], . . . ), or so forth. In some documents, superscript or bracketed letters may be used instead of numerals or numbers. In some documents, symbols other than numerals, numbers, or letters are used as the reference marks. For example, a note may employ a dagger (†) reference mark, an asterisk (*) reference mark, or so forth, either in normal or superscript text. In some cases the reference marks may be italicized or otherwise set off.

The note detection systems and methods disclosed herein combine two characteristics of notes that are almost universal: (i) the segregation of note text into a separate note zone; and (ii) the identification of two similar reference marks per note, namely a body reference mark in the body zone indicating the content to which the note refers, and a note reference mark in the note zone preceding the note text. In most note systems, the body reference mark is nominally identical with its corresponding note reference mark. For example, the body text may read:

... Smith has performed extensive research into this subject.[16] But, ... and the corresponding note including its note reference mark may read:

[16]. See, e.g., Smith et al., J. Rect. Subjects 10, 378 (2001).

In this case, the body reference mark [16] refers the reader to the note marked by the identical note reference mark [16], and the note provides additional relevant information in the form (in this illustrative instance) of a reference to an outside article by author Smith. Although in principle the body reference mark and its corresponding note reference mark should be identical, in practice some differences may arise due to OCR errors, misprints, and so forth. Moreover, the symbols used for reference marks may also be used for other purposes in the text. For example, numerals or numbers may be used both as reference marks and to denote quantities or other numerical values in the text, and may also be used to enumerate sections or other logical elements of the document. The identification of the note zone is also complicated by certain factors. For example, although the note text is usually separated into a distinct note zone such as one of those identified in Table 1, the size of the note zone may vary widely depending upon the number of notes and the length of the note texts. Moreover, there is no single widely used demarcation of the note zone. Rather, some documents may set off the note zone using spaces, while other documents may use a special font size or type to set off the content of the note zone, while yet other documents may employ a separator line. Indeed, more than one such demarcation may be used in the same document, for example using a separator line to demark the footnote zone but a special font characteristic to demark content of a table note zone.

Figure 2:
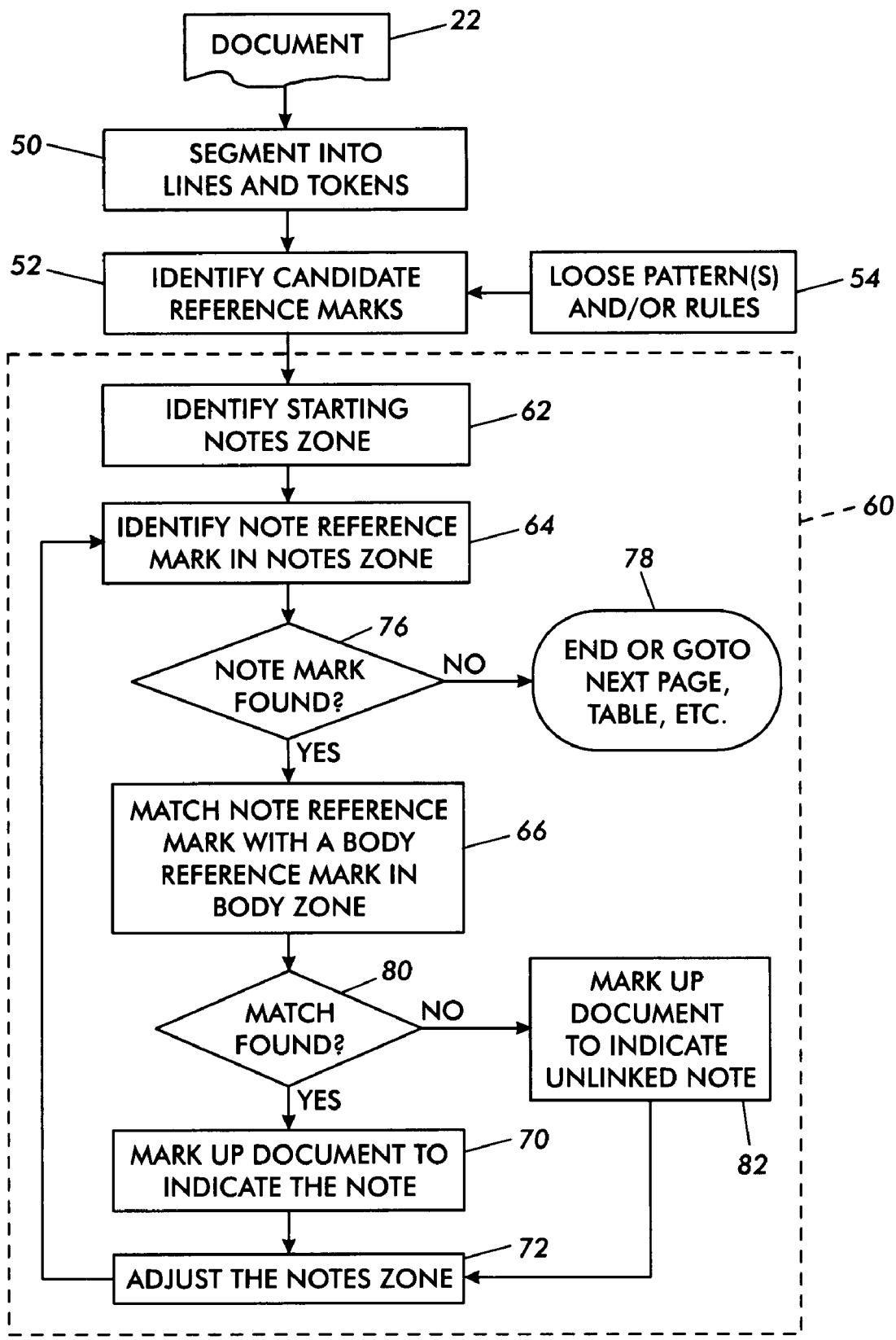
FIG. 2 diagrammatically shows a notes detection and markup method suitably performed by the system of FIG. 1.

With continuing reference to FIG. 1 and with further reference to FIG. 2, an illustrative note detection and markup approach is described. In a pre-processing operation 50, the document 22 is processed by the document segmentation system (embodied in illustrative FIG. 1 as the document segmentation software 24 executing on the computer 10) to generate the tokenized document 28. In the pre-processing 50, the document 22 is segmented into lines and tokens, that is, word-size elements. In some embodiments, a commercial segmentation system such as FineReader (available from ABBYY USA Software House, Fremont, Calif.) is used to perform this operation. The preprocessing operation 50 optionally may preserve or fail to preserve font information and other layout information, since the note detection approaches disclosed herein do not rely upon layout information. If the notes are footnotes, column notes, or other notes that align with pagination, then pagination information relating to the document 22 should be retained in some form. The pagination information can be retained by storing content by page, or by marking up the segmented document to indicate page breaks. More generally, elements which characterize the kind or kinds of notes to be detected should be marked-up or information pertaining thereto identified. For instance, detection of footnotes entails page mark-up, detection of table notes entails tables mark-up, and so forth. Groups of note text corresponding to notes should also be identified or marked up—typically, paragraph segmentation is sufficient, and FineReader and some other commercial segmentation packages readily provide paragraph segmentation with a high degree of accuracy.

In an operation 52, candidate reference marks are identified. The operation 52 is suitably performed, for example, by the candidate reference marks identification subsystem of FIG. 1, and suitably utilizes a loose pattern or patterns or rules 54 such as the loose patterns 34, 36 for body and note reference marks diagrammatically shown in FIG. 1. Loose patterns advantageously enable recognition of reference marks even in the presence of OCR errors. The candidate reference marks identification operation 52 is preferably overinclusive in that it preferably identifies all reference marks as candidate reference marks, even at the possible expense of also identifying some other content as candidate reference marks. Such overinclusiveness is readily achieved using loose pattern recognition implemented, for example, as regular expressions. The loose pattern or patterns optionally also incorporate certain other rules that reference marks are expected to follow. For example, a body reference mark is expected to not be directly followed by a letter, but rather to be followed by a space or perhaps by a punctuation mark. On the other hand, a note reference mark is expected to be the first element of a line and hence is not expected to be directly preceded by any previous character. At least because of this difference between the expected pattern of body reference marks (no following letter) versus note reference marks (no preceding character) it is advantageous to employ a loose pattern 34 for body reference marks and a different loose pattern 36 for note reference marks. The following are some illustrative examples of loose patterns written using regular expressions to be applied at the token level:

$$\text{``^([0-9]+)\$''} \tag{1},$$

$$\text{``^([^a-zA-Z0-9]\{1,2\}).+''} \tag{2},$$

$$\text{``[^0-9]*([^0-9]+)[^\% a-zA-Z0-9]''} \tag{3},$$

and $$\text{``[a-zA-Z\.]*([^a-zA-Z0-9]\{1,2\})[^a-zA-Z]*\$''} \tag{4}.$$

Expressions (1)-(4) utilize conventional regular expression syntax employed by typical text editors and the like. Considering Expression (1), for example, the notation [0-9] denotes occurrence of any digit, and the suffix "+" denotes that there is at least one of the preceding, so that [0-9]+ denotes any set of one or more contiguous digits. The initial "^" symbol in Expression (1) means that the expression is satisfied if the one or more contiguous digits begin the token. Accordingly, Expression (1) is suitable for identifying note reference marks that begin with digits. The terminating "$" symbol in Expression (1) means that the expression is satisfied if the one or more contiguous digits occur at the end of the token. Accordingly, Expression (1) is also suitable for identifying body reference marks. The parentheses "( ... )" in Expressions (1)-(4) denote the "marked sub-expression" that is returned by a match. In Expressions (1)-(4), the returned information is further demarked by using boldface text for the returned elements. Expression (2) can be suitably applied to identify note reference marks, but not body reference marks. Expression (3) and Expression (4) can be suitably applied to identify body reference marks, but not note reference marks.

Normalization can be performed over the returned reference mark value. For example, Expression (3) allows an apostrophe or question mark to be part of the returned reference mark. In this way, Expression (3) is configured to accommodate a typical OCR error of mistaking a superscript "1" for an apostrophe or comma. Other typical OCR errors or misprints can be similarly accommodated.

The loose patterns defined by Expressions (1) (4) embody in various ways expected patterns of symbols as well as the rules regarding the body reference mark terminating a token, the note reference beginning a token, or both. Different or additional rules can be incorporated in identifying candidate reference marks. For example, another advantageous rule is to ignore any line composed of one single token matched by the loose pattern. For example, a pure number with spaces or punctuation both immediately preceding and immediately following would satisfy Expression (1), but is nonetheless unlikely to be a reference mark since there is no text around it corresponding to the note itself. Rather, it is likely to be a page number, or a number that is part of the content of the document, or a chapter index, or so forth.

Expressions (1)-(4) are not reliant upon layout information, and accordingly are applicable where, for example, the preprocessing 50 results in loss of layout information such as superscripting. It is also contemplated for the loose pattern to incorporate layout information. For example, a loose pattern can be constructed that selects all tokens that have a different layout from its previous or next token. This single pattern is typically sufficient for recognizing both body and note reference marks in portable document formatted (PDF) documents not generated by OCR. Another suitable approach for identifying candidate reference marks is to take any superscript content as a reference mark. This approach is suitable when it is known a priori that the document uses superscript reference marks and when it is known a priori that the document does not have a large amount of other superscript text.

Once candidate body and note reference marks are identified, the processing of FIG. 2 considers each type of note to be detected in turn using a processing block 60. The processing block 60 is suitably embodied in the system of FIG. 1 by the linked reference marks identification subsystem and the note markup subsystem. For each type of note, a starting notes zone is identified in a process 62. The starting notes zone depends upon the type of note, and is selected to maximize a likelihood that the selected starting notes zone contains a note. For example, considering footnotes, it is known that the footnote or footnotes, if any, will be located at the bottom of the page. However, it is not known a priori how far up the page such footnotes extend. Accordingly, the starting footnotes zone is proximate to the bottom of a page of the document, for example identified as the bottommost paragraph of the page. The starting body zone then corresponds to the remainder of the paragraphs, possibly excluding any paragraphs in the margin. Similarly, the starting notes zone for column notes is proximate to a bottom of a column of text on a page of the document, and is suitably identified for example as the bottommost paragraph of a column of text, the remaining paragraphs of the column being assigned to the starting body zone. On the other hand, a table or caption typically has its note or notes, if any, located below the table or caption, but again it is not known a priori how far below the table or caption the notes extend. Accordingly, the starting notes zone for a table or caption is proximate to a bottom of the table or caption, and is suitably identified for example as the first paragraph immediately below the table or caption. In the case of margin notes, the starting notes zone is suitably identified as the first paragraph in the margin of the page.

In a process operation 64, a note reference mark is identified in the notes zone. Since the candidate reference marks are available from operation 52, performance of the identification operation 64 is straightforward. In a matching operation 66, a matching body reference mark is identified that is similar to the note reference mark identified in operation 64. Again, since the candidate reference marks are available from operation 52, performance of the matching operation 66 is straightforward. Once a matched pair of body and note reference marks has been identified, the document is marked up to indicate the note in a markup operation 70 suitably performed by the note markup subsystem of FIG. 1. The note zone is then adjusted in an operation 72. For footnotes or column notes, this operation 72 entails expanding or shifting the footnotes zone up in the page or expanding or shifting the column notes zone up in the column, respectively. For table notes or caption notes, this operation 72 entails expanding or shifting the footnotes zone down away from the table or caption, respectively. Process flow then returns to operation 64 where another note reference mark is identified in the shifted or expanded notes zone. This repetition of the identifying operation 64 suitably ignores any notes identified in previous passes.

With continuing reference to FIG. 2, at some point the identification operation 64 will fail to identify a note reference mark. This may occur on the initial pass if, for example, the page or table or caption or other element under analysis does not contain any notes, or may occur in a subsequent pass once the note or notes pertaining to the page, table, caption, or other element have been processed. At a decision 76, it is recognized that no additional note has been found, at which point process flow moves to an exit operation 78 which may either exit entirely, or may go to the next element of the type being analyzed (e.g., the next page if footnotes are being analyzed), or may go to the next type of element (e.g., if all pages have been analyzed for footnotes, then the exit operation 78 may restart the processing block 60 to process table notes).

Similarly, even though a note reference mark is found in the notes zone, it is possible that no similar body reference mark may be identified in the body zone. This may occur if, for example, the body reference mark was not successfully added to the set of candidate reference marks in the operation 52. A decision 80 detects such an event, and process flows to an alternative markup operation 82 by which the note markup subsystem marks the document to indicate that a note has been identified without a matching body reference mark.

Figure 3:
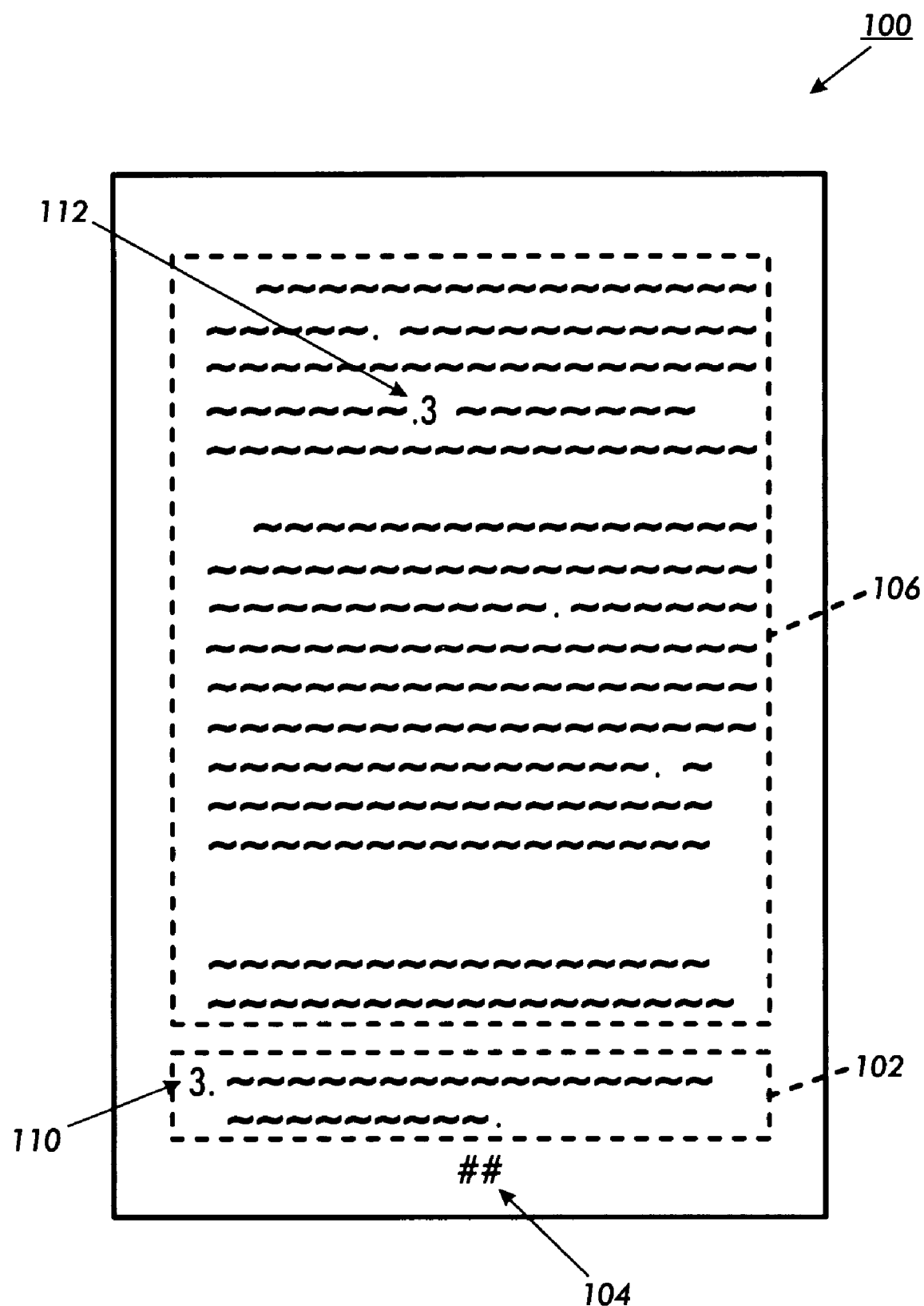
FIGS. 3 and 4 diagrammatically show detection of a first note and a second note.
Figure 4:
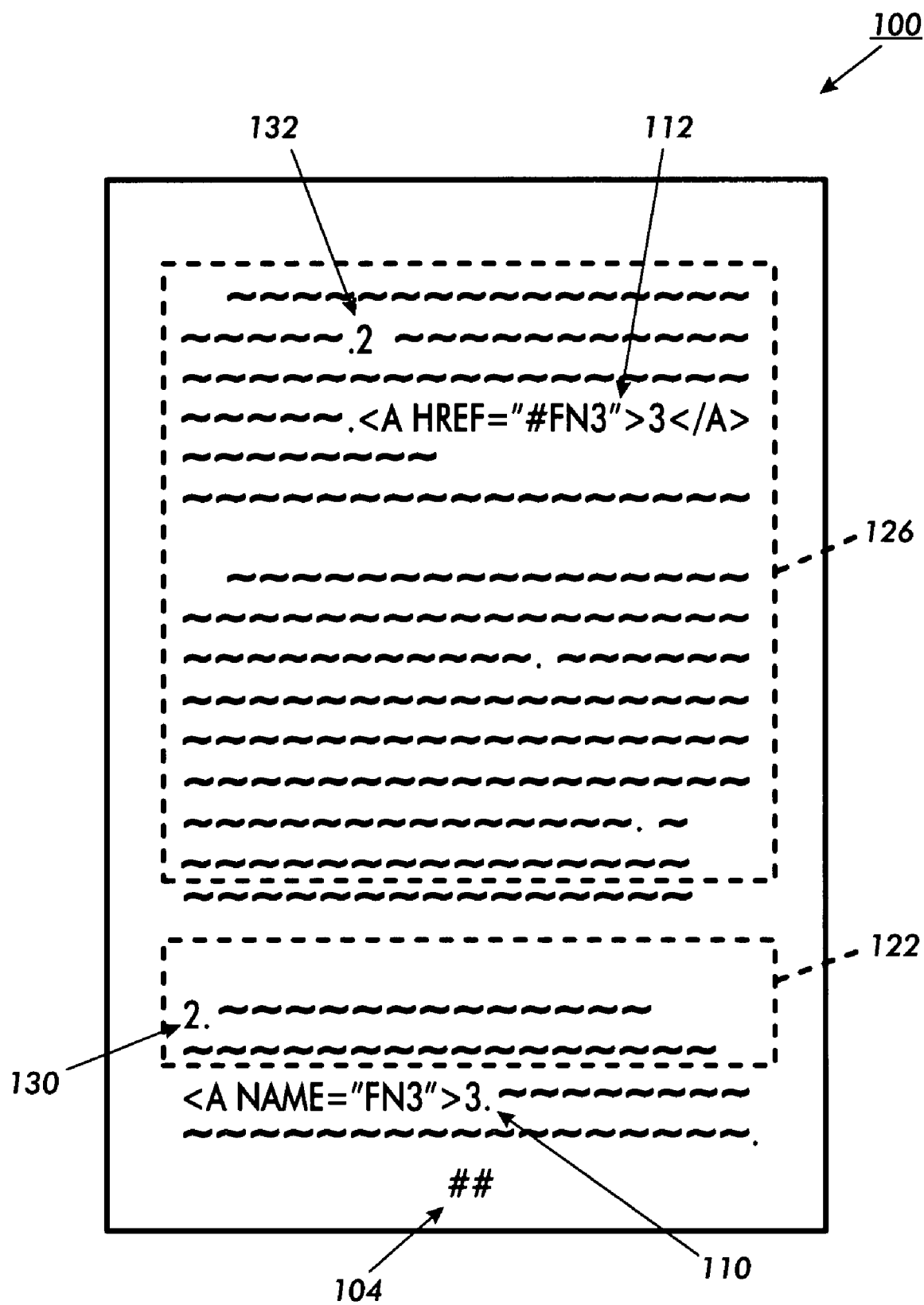

With reference to FIGS. 3 and 4, the processing of FIG. 2 applied to detecting footnotes is illustrated using a diagrammatic page 100 of a document. FIG. 3 shows the page 100 with a starting footnotes zone 102 corresponding to the bottommost paragraph of the page 100, not counting a page number 104. This leaves the remaining paragraphs of the page 100 as a starting body zone 106. A note reference mark "3" 110 is identified in the notes zone 102 by the process operation 64. A corresponding body reference mark "3" 112 is identified in the body zone 106 by the process operation 66. As shown in FIG. 4, the markup operation 70 marks up the page 100 of the document to indicate the detected note. In FIG. 4, this markup is in the form of an HTML hyperlink markup including a hotlink defined by the HTML markup <A HREF="#FN3"> . . . </A> inserted into the body zone 106 around the body reference mark "3" 112, and a corresponding local anchor defined by the HTML markup <A NAME="FN3"> inserted just immediately preceding the note reference mark "3" 110 in the notes zone 102. Instead of an HTML hyperlink markup, other markup notations or syntax can be used. For example, in XML a suitable markup might include an XML tag <noteref idref="3"/> inserted in place of the body reference mark "3" 112, and a corresponding XML tag <note id="3"> inserted in place of the note reference mark "3" 110. Another contemplated markup is to insert or apply highlighting, boldface, underscore, italicization, or another layout modification to draw attention to the reference marks of the note. As further shown in FIG. 4, the processing continues by having the adjustment process operation 72 shift the note zone upward to define adjusted note zone 122 (or, the note zone can be expanded upward), and a corresponding adjusted body zone 126. A new note is identified including a note reference mark "2" 130 and a body reference mark "2" 132 as again indicated in FIG. 4.

Implementation of a new type of note using the systems and methods disclosed herein entails constructing an algorithm to determine the locations of the body zone and the note zone. An algorithm to determine the location of the note zone can be implemented, for example, by a function isInNoteZone( ), and an algorithm to determine the location of the body zone can be implemented, for example, by a function isInBodyZone( ). As noted previously, for example, in the case of footnotes isInNoteZone( ) examines the bottommost paragraph of a page initially, and moves upward on the page after each note is processed. The isInBodyZone( ) function identifies the paragraphs above the current note zone paragraph as the body zone. Suitable pseudocode is as follows:

```
for noteType in AllNoteTypes:
    # Collect all possible candidates
    noteType.collectCandidates( )
    # Build Links between reference marks and notes
    noteType.findCommonMarkBetweenNoteAndBodyZone( )
    noteType.markupNotes ( )
    # Iterate until no new note found
    while new notes found:
        noteType.findCommonMarkBetweenNoteAndBodyZone( )
        noteType.markupNotes ( )
```

The foregoing illustrative pseudocode implementation iterates over all the selected types of notes (page, table, and so forth). One starts by collecting all potential reference marks using the generic patterns (collectCandidates( )) in the body-zone and the note-zone. Then for each candidate in the note zone, one tries to find a reference mark which is also present in its body-zone (findCommonMarkBetweenNoteAndBodyZone( )). Various constraints are optionally used in order to filter out some candidates. As noted previously, the note reference mark typically starts a paragraph. This optional criterion is embodied, for example, in Expressions (1) and (2) already set forth. Another optional criterion for filtering out certain candidate note reference marks already mentioned is to eliminate any situation in which the line is composed of a single token, as such a situation is more likely to be a page number or other entity rather than a note reference mark. The analysis of the note zone in some embodiments considers only one paragraph, chosen depending on the type of note being searched. For footnotes, the bottommost paragraph of a page is suitable. For a table, the paragraph immediately below the table is suitable.

Since several notes can be found in a note-zone, an iterative approach is suitable, such as that shown in FIG. 2 or represented by the illustrative pseudocode set forth herein. Once a note has been identified in the note zone, it is ignored during the next iteration and a new paragraph can be recognized as a potential note (as shown, for example, in FIG. 4). This iterative process does not entail any predefined extent of the note zone or of the body zone, and accordingly can detect notes which cover a large part of the page, or can detect a single short note located at the bottom of the page, using the same processing algorithm. Moreover, since most computation time is spent in the collectCandidates( ) function, the iterative approach does not have a substantial adverse impact on processing time. A contemplated speed optimization is to take into account only zones where notes have been previously found (except for the first iteration).

In the process of FIG. 2 and the illustrative pseudocode, it is assumed that each note comprises a single paragraph (which could be a single line or even a single word, or a single-sentence citation or so forth). In a contemplated variation, multi-paragraph notes are suitably accommodated by identifying two successive note reference marks in the note zone such that the text or other content lying between the two successive note reference marks is associable with the first note reference mark.

The loose patterns of Expressions (1)-(4) are intended to identify a single numeral or number as a note reference mark. It is contemplated to extend the loose pattern to encompass a multi-number reference mark, such as "[1, 2, 3]". Conversely, it is contemplated for one note to be referenced by several body reference marks. This situation can be addressed by modifying the findCommonMarkBetweenNoteAndBodyZone( ) function such that the main iteration is done over the body reference marks. (FIG. 2 and the illustrative pseudocode performs the main iteration over the note reference marks, e.g. iteration of the processing block 60 causes the operation 64 to identify each note reference mark in turn.

In other embodiments, it is recognized that a note can be sufficiently long so as to extend over two or more note zones. For example, a footnote may be split over two or more pages. A contemplated variation of the method of FIG. 2 and the pseudocode is as follows. For each note, check in the next note zone (e.g., the note zone of the next page) to see if the element returned by isInNoteZone( ) has the same layout as the current note. If the returned element does not start with a typical beginning of paragraph, it is considered as the continuation of the current note.

An embodiment of the note detection algorithm substantially as set forth in FIG. 2 and the illustrative pseudocode has been constructed and tested on ten documents having between zero and 250 notes per document. The document with zero notes provided no false-positives. For the document with 250 notes, the algorithm found about 92% of the notes, with an identification accuracy of about 98%. For other documents, the percentage of notes found ranged between 71% and 100%, and the identification accuracy ranged between 92% and 100%. The types of notes on which the embodiment was tested included footnotes, table notes, and section- or end-notes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A notes detection method comprising:
   identifying candidate reference marks in a document wherein the identifying of candidate reference marks comprises identifying candidate body reference marks and identifying candidate note reference marks;
   identifying a starting note zone in the document;
   identifying a pair of similar reference marks from the candidate reference marks including a first reference mark in the note zone and a second reference mark outside the note zone; and
   marking the document to indicate a note associated with the first and second reference marks;
   wherein at least the identifying of candidate reference marks and the identifying of a pair of similar reference marks is performed by a processor.

2. The notes detection method as set forth in claim 1, further comprising:
adjusting the note zone;
identifying a second pair of similar reference marks including a third reference mark in the adjusted note zone and a fourth reference mark outside the adjusted note zone; and
marking up the document to indicate a second note associated with the third and fourth reference marks;
wherein at least the adjusting and the identifying of the second pair is performed by the processor.

3. The notes detection method as set forth in claim 2, wherein the identifying of a starting notes zone comprises identifying a footnotes zone proximate to a bottom of a page of the document or a column notes zone proximate to a bottom of a column of text on a page of the document, and the adjusting of the notes zone comprises expanding or shifting the footnotes zone up in the page or expanding or shifting the column notes zone up in the column.

4. The notes detection method as set forth in claim 2, wherein the identifying of a starting notes zone comprises identifying a table notes zone proximate to a bottom of a table of the document, and the adjusting of the notes zone comprises expanding or shifting the table notes zone generally downward away from the table.

5. The notes detection method as set forth in claim 1, wherein the identifying of a pair of similar marks from the candidate reference marks including a first reference mark in the note zone and a second reference mark outside the note zone comprises:
identifying the first reference mark as one of the candidate note reference marks; and
identifying the second reference mark as one of the candidate body reference marks.

6. The notes detection method as set forth in claim 1, wherein (i) the identifying of candidate body reference marks comprises comparing portions of the document with a first loose pattern and (ii) the identifying of candidate note reference marks comprises comparing portions of the document with a second loose pattern different from the first loose pattern.

7. A digital system comprising a processor configured to perform the method of claim 1.

8. A non-transitory storage medium or storage media storing instructions executable by a processor to perform the method of claim 1.

9. A notes detection method comprising:
identifying candidate reference marks in a document by comparing portions of the document with a loose pattern, the candidate reference marks corresponding to matches with the loose pattern;
identifying a starting note zone in the document;
identifying a pair of similar reference marks from the candidate reference marks including a first reference mark in the note zone and a second reference mark outside the note zone; and
marking up the document to indicate a note associated with the first and second reference marks;
wherein at least the identifying of candidate reference marks and the identifying of a pair of similar reference marks is performed by a processor.

10. The notes detection method as set forth in claim 9, wherein the document is a tokenized document, and the comparing comprises:
comparing tokens of the document with a loose pattern defined by a regular expression, candidate reference marks being identified as matches with the loose pattern.

11. The notes detection method as set forth in claim 10, wherein the regular expression is configured to accommodate common optical character recognition (OCR) errors including at least erroneously misrecognizing a superscript "1" as an apostrophe or quotation mark.

12. A digital system comprising a processor configured to perform the method of claim 9.

13. A notes detection method comprising:
identifying candidate reference marks in a document;
identifying a starting note zone in the document;
identifying a pair of similar reference marks from the candidate reference marks including a first reference mark in the note zone and a second reference mark outside the note zone; and
marking up the document to indicate a note associated with the first and second reference marks wherein the marking up comprises creating a hyperlink between the first and second reference marks such that selection of the second mark causes display of the note;
wherein at least the identifying of candidate reference marks, the identifying of a pair of similar reference marks, and the marking up is performed by a processor.

14. The notes detection method as set forth in claim 13, further comprising:
adjusting the note zone;
identifying a second pair of similar reference marks including a third reference mark in the adjusted note zone and a fourth reference mark outside the adjusted note zone; and
marking up the document to indicate a second note associated with the third and fourth reference marks wherein the marking up to indicate the second note comprises creating a hyperlink between the third and fourth reference marks such that selection of the third mark causes display of the note;
wherein at least the adjusting, the identifying of the second pair, and the marking up to indicate the second note is performed by the processor.

15. The notes detection method as set forth in claim 14, wherein the identifying of a starting notes zone comprises identifying a footnotes zone proximate to a bottom of a page of the document or a column notes zone proximate to a bottom of a column of text on a page of the document, and the adjusting of the notes zone comprises expanding or shifting the footnotes zone up in the page or expanding or shifting the column notes zone up in the column.

16. The notes detection method as set forth in claim 14, wherein the identifying of a starting notes zone comprises identifying a table notes zone proximate to a bottom of a table of the document, and the adjusting of the notes zone comprises expanding or shifting the table notes zone generally downward away from the table.

17. A digital system comprising a processor configured to perform the method of claim 13.

18. A non-transitory storage medium or storage media storing instructions executable by a processor to perform the method of claim 13.

19. A non-transitory storage medium or storage media storing software including:
candidate reference marks identification software executable to identify candidate reference marks in a document by comparing tokens of the document with a loose pattern defined by a regular expression and identifying candidate reference marks as matches with the loose pattern;
linked reference marks identification software executable to identify a pair of similar reference marks from the candidate reference marks including a first reference mark in the note zone and a second reference mark outside the note zone; and note markup software executable to mark up the document to indicate a note associated with the first and second reference marks.

20. The non-transitory storage medium or storage media as set forth in claim 19, wherein the linked reference marks identification software is further executable to adjust the note zone and identify a second pair of similar reference marks including a third reference mark in the adjusted note zone and a fourth reference mark outside the adjusted note zone, and the note markup software is further executable to mark up the document to indicate a second note associated with the third and fourth reference marks.

21. The non-transitory storage medium or storage media as set forth in claim 19, wherein the candidate reference marks identification software is executable to identify candidate body reference marks based on comparison with a first loose pattern and to identify candidate note reference marks based on comparison with a second loose pattern different from the first loose pattern.

\* \* \* \* \*